United States Patent
Barrenscheen

(10) Patent No.: US 10,887,074 B1
(45) Date of Patent: Jan. 5, 2021

(54) FULL DUPLEX COMMUNICATION USING EDGE TIMING IN A SIGNAL

(71) Applicant: Infineon Technologies AG, Neubiberg (DE)

(72) Inventor: Jens Barrenscheen, Munich (DE)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 16/530,116

(22) Filed: Aug. 2, 2019

(51) Int. Cl.
*H04L 5/12* (2006.01)
*H04L 5/14* (2006.01)
*H04L 7/00* (2006.01)

(52) U.S. Cl.
CPC ............ *H04L 5/1438* (2013.01); *H04L 5/143* (2013.01); *H04L 5/1415* (2013.01); *H04L 7/0058* (2013.01)

(58) Field of Classification Search
CPC ..... H04L 5/1438; H04L 5/1415; H04L 5/143; H04L 7/0058
USPC .......................................................... 375/262
See application file for complete search history.

(56) References Cited

U.S. PATENT DOCUMENTS

| | | | |
|---|---|---|---|
| 7,203,230 B2 | 4/2007 | Vaananen | |
| 2004/0001483 A1* | 1/2004 | Schmidt | H04J 3/0691 370/364 |
| 2005/0235110 A1 | 10/2005 | Mylly | |
| 2009/0022255 A1* | 1/2009 | Kanekawa | G06F 13/4291 375/356 |
| 2009/0070506 A1 | 3/2009 | Furtner | |
| 2013/0197920 A1* | 8/2013 | Lesso | G10L 19/002 704/500 |
| 2013/0246675 A1 | 9/2013 | Korpinen | |
| 2014/0247834 A1* | 9/2014 | Poulsen | H04L 12/4035 370/458 |
| 2015/0270994 A1* | 9/2015 | Scherr | H04L 25/4902 375/238 |
| 2017/0345472 A1* | 11/2017 | Goto | G11C 7/1018 |
| 2018/0237148 A1 | 8/2018 | Hehn | |

* cited by examiner

*Primary Examiner* — Helene E Tayong
(74) *Attorney, Agent, or Firm* — Eschweiler & Potashnik, LLC

(57) ABSTRACT

Systems, methods, and circuitries are provided to perform full duplex communication using edge timing in a common signal. In one example, a method for a slave device includes receiving a common signal resulting from combination of a slave signal transmitted by the slave device on a signal line and a master signal transmitted by the master device on the signal line. The common signal includes a series of signal periods having a first edge and a second edge. The method includes, in a period of the common signal: determining slave information to be communicated; selecting a second edge timing corresponding to the slave information; detecting the first edge in the common signal; transmitting a slave signal having a first slave edge at the second edge timing after the first edge; and determining master information based on a detected level of the common signal at a check point of the signal period.

24 Claims, 8 Drawing Sheets

FULL DUPLEX COMMUNICATION USING EDGE TIMING IN A SIGNAL

FIELD

The present disclosure relates to the field of communication protocols and techniques and in particular to methods, systems, and circuitry for communication of status and data between devices.

BACKGROUND

Many microprocessor applications rely on a robust, simple, and low-bandwidth communication path between two devices. In safety-relevant applications, a large number of communication paths are used to ensure that each safety-relevant device is functioning properly. Thus, it is important that the communication paths in such applications support fast and reliable communication without requiring an extensive number of pins or extra components.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1A:
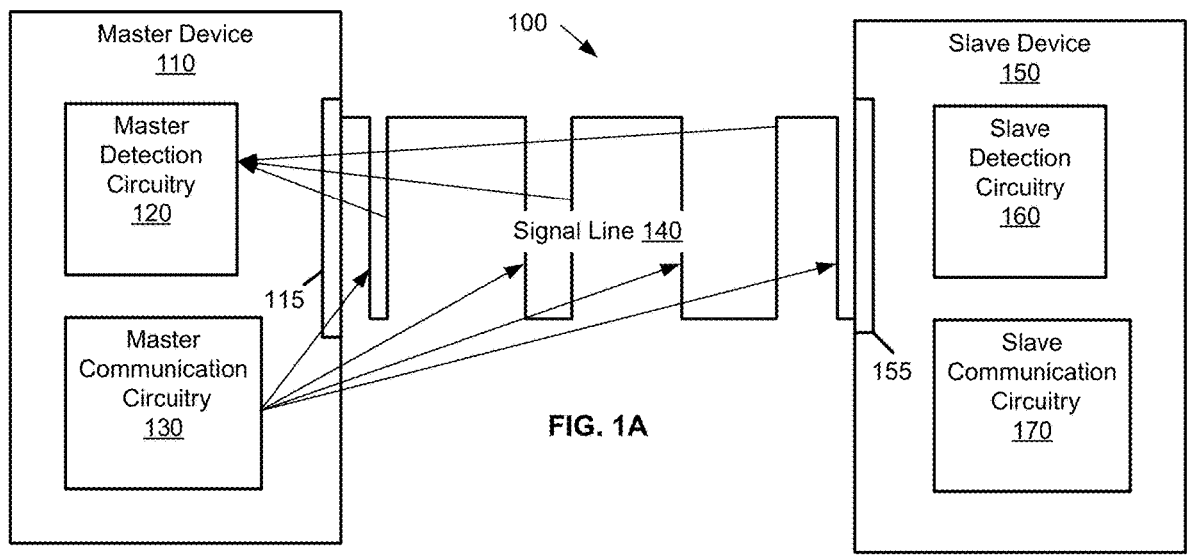
FIGS. 1A and 1B illustrate one example of a communication system that includes two devices performing bidirectional and/or full duplex communication using edge timing in a signal in accordance with various aspects described.

In some microprocessor device applications, a central or master controller monitors the health or status of many different edge or slave devices under the control of the master controller. If any slave device malfunctions, the master controller takes remedial action such as ceasing communication with the malfunctioning device and/or entering some sort of failsafe mode with respect to the function performed by the malfunctioning device. Each slave device in turn monitors the health or status of the master controller and enters a failsafe mode in the event that the master controller malfunctions. The reaction time target for such systems is on the order of several tens of microseconds to several hundreds of microseconds. Because the malfunction of one slave device should not be allowed to corrupt the communication of another slave device, a dedicated communication channel is often installed between each slave device and the master controller. Thus the continuous monitoring of status between master controller and slave device requires fast and reliable communication through numerous communication paths.

For the purposes of this description, the terms "master" and "slave" will be used to distinguish between two devices performing the described communication using edge timing in a signal. It is to be understood that the described techniques can be performed by any two devices, regardless of whether the devices are in a master-slave relationship. Further, while certain functions in the communication techniques may be attributed to one of the master device or the slave device, it is to be understood that the functions may instead or additionally be performed by the other of the master or slave device.

In complex microprocessor applications that include communication between many devices, it is understood that leaner communication techniques provide lower failure rates and simple, less expensive design. Many conventional safety-relevant applications include a first communication channel or line that is used by the master controller to communicate a "life-sign" (e.g., a pulse at some predetermined timing) to the slave device. A second communication channel or line is used for the slave device to communicate the slave status or diagnostic information. This two-channel communication is typically synchronized according to some common clock, further complicating the communication system design. In other solutions, the slave device does not regularly send information to the master but rather blocks a communication line for a predetermined period and then sends information to the master on the line as needed. This technique slows the communication and potentially destroys the transmission from the master to the slave occurring when the line is blocked.

Described herein are methods, systems, and circuitries that perform communication using edge timing in a signal. The described methods, systems, and circuitries can use a single line to communicate both the master and slave status as well as additional information without the need for an external clock signal, thereby reducing the number of communication lines used and greatly simplifying the communication system design.

Figure 1B:
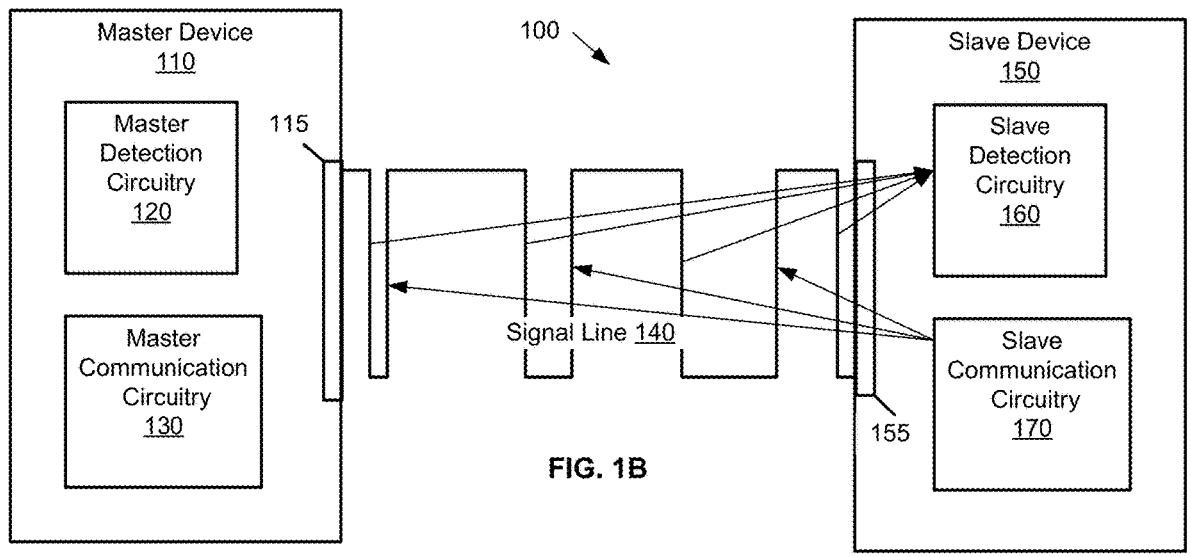

FIGS. 1A and 1B illustrate communication system 100 that includes a master device 110 (hereinafter "master") and a slave device 150 (hereinafter "slave"). In some examples the master 110 is microcontroller that provides pulse-width-modulated (PWM) or other control signals to the slave 150 and many other slaves (not shown). In some examples, the slave 150 is a gate driver for a high power device such as a fuel injector, motor, or solenoid. In some examples, the slave 150 is an isolated gate driver for a measurement device that measures, as controlled by the master 110, a temperature or voltage of another device and generates digital data encoding the measured temperature or voltage.

The master 110 and slave 150 are connected, through respective interfaces 115, 155, to a single signal line 140, which is illustrated conducting an example common signal.

As will be described in more detail in FIG. 3, the common signal includes a series of alternating types edges (e.g., rising or falling). The common signal has a signal period that is defined by the time between adjacent falling edges. Of course, rising edges may define the common signal period in other examples. Throughout this description, falling edges are generated by the master and interpreted by the slave while rising edges are generated by the slave and interpreted by the master. It is to be understood that rising edges may be generated by the master and interpreted by the slave while falling edges are generated by the slave and interpreted by the master in other examples.

FIG. 1A illustrates one example of the master 110 in operation. The master 110 includes master detection circuitry 120 and master communication circuitry 130. The master detection circuitry detects 120 the timing of rising edge in each signal period and interprets the timing of the rising edge as communicating information from the slave 150. For example, the master detection circuitry 120 may interpret the timing of the rising edge as an indication of the operational status of the slave 150. The master 110 includes other components, not shown here, that are configured to take remedial action in response to the common signal indicating that the slave 150 is not functioning properly. In other examples, the master detection circuitry 120 may interpret the timing of the rising edge as communicating data generated by a component of the slave 150. The master 110 may include components, not shown, that perform additional processing on the decoded data determined by the master detection circuitry 120 based on the timing of the rising edges The master communication circuitry 130 determines, at some regular interval, a status of the master 100 and generates a falling edge in a subsequent period based on the determined status. For example, if the master 110 is functioning properly, the master communication circuitry 130 may generate a falling edge according to a predetermined timing, thus setting the signal period of the common signal to a regular time interval.

FIG. 1B illustrates one example of the slave 150 in simultaneous operation with the master 110. The slave 150 includes slave detection circuitry 160 and slave communication circuitry 170. The slave detection circuitry 160 detects the timing of the falling edges and interprets the time between adjacent falling edges as defining the signal period of the common signal. In one example the slave detection circuitry 160 determines that the master 110 is operating properly when a falling edge falls within some predetermined window within the signal period established by prior falling edges.

In each signal period, the slave communication circuitry 180 generates a rising edge in the common signal. The slave communication circuitry 180 determines information to be communicated to the master 110 and selects a rising edge timing, within the signal period, that communicates that information. For example, if the slave is functioning properly, the slave generates the rising edge at a first time in the signal period that will be interpreted by the master detection circuitry 120 as such. If the slave determines that it is not functioning properly, the slave can generate the rising edge at a second time in the signal period that will be interpreted by the master detection circuitry 120 as such. In another example, the slave 150 may have digital data (e.g., temperature or voltage) to communicate to the master 110. The slave communication circuitry 180 may select a first timing of the second edge to communicate a "1" or a second timing of the second edge to communicate a "0".

It can be seen that the communication system 100 provides a single communication line 140 that conducts a common signal that simultaneously communicates, using edge timing, information from the master 110 to the slave 150 and from the slave to the master. Throughout this description, the specific timing of edges are described as being detected. The detection of the timing of edges may be performed in many ways. For example, the value of the common signal may be checked at a certain time and the timing of an edge that occurred prior to the check time may be deduced based on the value of the signal. Alternatively, an amount of energy received during a signal period may be used to deduce a time point during the signal period where a transition from low to high occurred. For example, if the amount of energy is equal to about a third of the amount of energy that would result from a signal period where the common signal has a high value throughout it can be deduced that the rising edge occurred at an expiration of approximately a third of the signal period. In another example, edge detector circuitry is employed.

Figure 2:
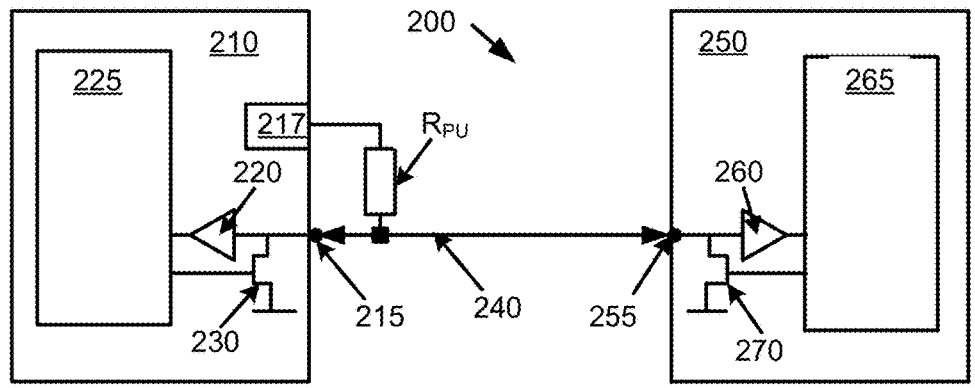
FIG. 2 illustrates one example of the communication system of FIGS. 1A and 1B in accordance with various aspects described.

FIG. 2 illustrates a communication system 200 that includes a master 210, a slave 250, and a signal line 240. The signal line 240 is configured as a "wired-AND" in which the signal line 240 is held to a high voltage using a voltage from a supply 217 in the master 210 applied to a pullup resistor $R_{PU}$ connected to the signal line. The external pullup resistor may $R_{PU}$ may be used for faster signaling. In other examples, an internal pullup resistor may be sufficient. A master interface 215 and a slave interface 255 are each a single pin on the master 210 and slave 250. In one example, a standard I/O pin is used as the interfaces 215, 255.

In the example of FIG. 2, master detection circuitry includes a buffer 220 that regenerates and stores the value of the common signal on the signal line 240 at a selected time and a processor 225. The buffer 220 provides the value of the common signal to a processor 225 that is configured to interpret the value of the common signal and the selected time to determine the information being communicated from the slave 250. Slave detection circuitry includes a buffer 260 that regenerates and stores the value of the common signal on the signal line 240 at a selected time and a processor 265. The buffer 260 provides the value of the common signal to the processor 265 so that the processor can interpret the value of the common signal and the selected time to determine the status of the master 210. The processor 265 interprets a time between adjacent falling edges as defining the signal period (common signal period in FIG. 3) and thus also the time period during which the slave 250 should communicate its information (the "slave communication time period" in FIG. 3).

Master communication circuitry includes an open-drain output 230 and the processor 225. When the open-drain output is closed by the processor 225, the common signal is pulled low or set to some defined level, creating a falling edge in the common signal. The processor 225 is configured to, when the master 210 is operational, close the open-drain output 230 for a relatively short predetermined duration of time. One example of a predetermined default master communication circuitry output can be seen in the top trace in FIG. 3. The signal period of the common signal, shown in the bottom trace, is defined as the time between the falling edges generated by the open-drain output 230.

Slave communication circuitry includes an open-drain output 270 and the processor 265. When a falling edge is detected the open-drain output 270 is closed by the processor 265 for an amount of time selected to place the rising edge generated when the open-drain gate is opened at some selected timing in the signal period. The output of the slave communication circuitry (shown in the second trace in FIG. 3) combines with the default signal of the master communication circuitry to extend the low value output by the master to generate a rising edge in the common signal (third trace) at a selected time. The selected time may be a proportion of the signal period (as defined by the falling edges and not an external clock) that communicates the appropriate information (e.g., a 1 or 0) or a status (e.g., several levels of slave functionality). For the purposes of this description, the term "proportion" means a portion of the signal period that is determined based on some particular ratio or percentage of the overall signal period (e.g., 20%, 50%, 100%, and so on) as defined by the duration of time between consecutive falling edges.

Bi-Directional Communication Using Common Signal

Figure 3:
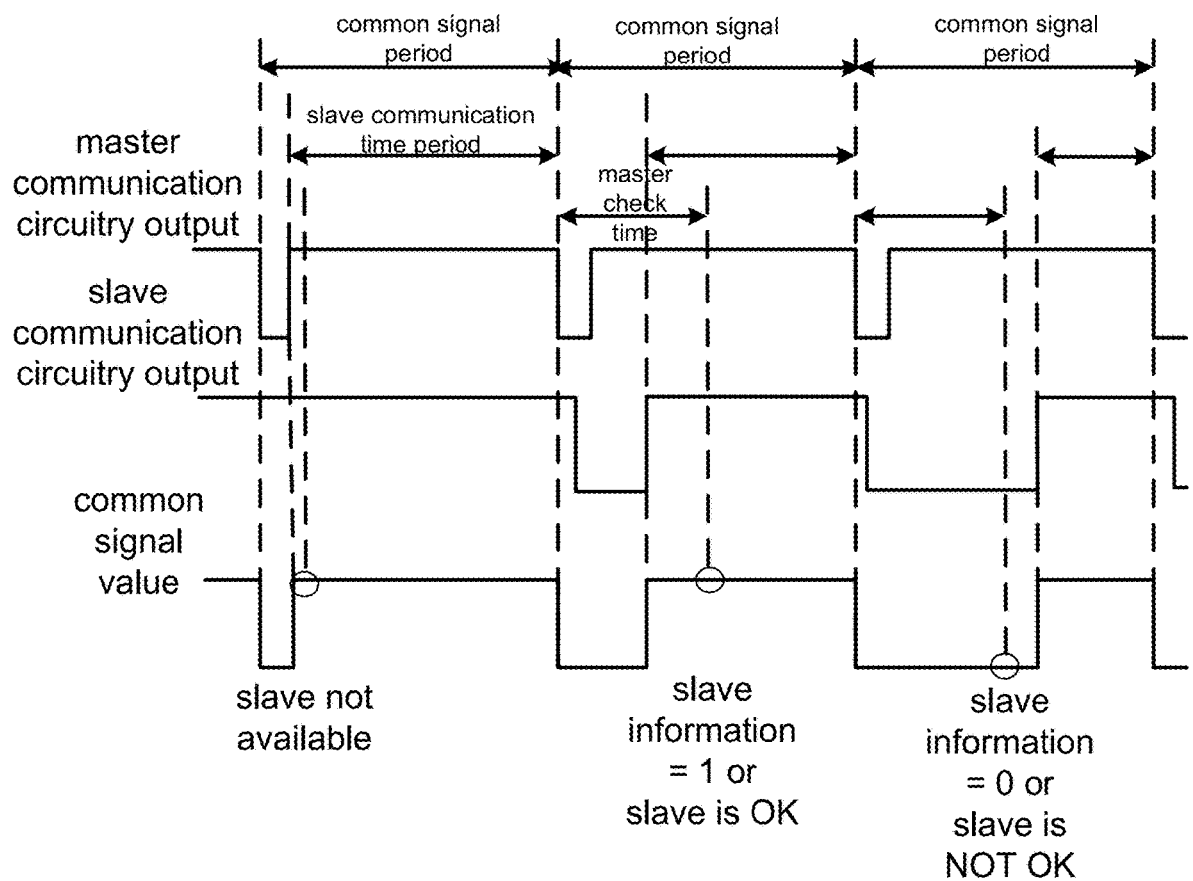
FIG. 3 illustrates a timing diagram of one communication protocol for bidirectional communication using edge timing in a signal in accordance with various aspects described.

FIG. 3 illustrates an example of how three different second edge positions in three different signal periods can communicate three different slave operational statuses and/or data values. As shown in the first signal period, when the slave does not act on the common signal at all the rising edge in the common signal occurs at the termination of the pulse sent by the master communication circuitry. If the master detection circuitry detects the rising edge (or a high value) at a time corresponding to the end of the master's pulse, the master interprets this rising edge as indicating that the slave is not available and takes remedial action if necessary or waits to determine if the slave becomes available later.

In each signal period, if the slave has acted on the common signal (e.g., is available) the master detection circuitry checks the value of the common signal at a predetermined time after the end of the master's pulse (e.g., midway or 50% through the signal period as shown by the "master check time" and circle on the common signal in FIG. 3). In the second signal period, when the master detection circuitry checks the common signal at the master check time, a high value is detected. This high value at the master check time is interpreted by the master detection circuitry as indicating that the slave is operational or, alternatively, that the slave is sending a data value of 1. Correspondingly the slave communication circuitry communicates that it is operational or sends a data value of 1 by holding the common signal line low for less than the master check time (e.g., less than 50% of the signal period). Instead of checking the value of the signal at a defined point within the period of the signal (=bit length), in an alternative, the length of the 0-level or the length of the 1-level of the signal may be measured in relation to the bit length. If the master detects a 1-level longer than a certain time x, it "knows" that the slave is not available. If the master detects a 1-level longer than a certain time y but shorter than x (with x>y), it "knows" that the slave is available and sends a first information. If the master detects a 0-level longer than z, it "knows" that the slave is available and sends a second information. Measuring the lengths of the 1-level or of the 0-level may be combined in different ways (in the master device and/or in the slave device), also together with checking the level of the signal at a defined time, to read the information sent by the communication partner device.

In the third signal period when the master detection circuitry checks the common signal at the master check time, a low value is detected. This low value at the master check time is interpreted by the master detection circuitry as communicating that the slave is not operational (e.g., has an active error) or, alternatively, that the slave is sending a data value of 0. Correspondingly the slave communication circuitry communicates that it is operational or sends a data value of 0 by holding the common signal line low for more than the master check time (e.g., more than 50% of the signal period).

Note that the time at which the master detection circuitry checks the common signal (and the time at which the slave communication circuitry generates falling edges) may be defined as a function or proportion of the signal period, which is in turn defined by the falling edges generated by the master communication circuitry and not an external clock. No external clock signal is necessary. There are no constraints on baud rate, except the settling time of the signal line after a change of the level to be transferred. If the timing of the falling edges changes during operation the signal period used by both master and slave will change and the communication will still be effective.

The scheme illustrated in FIG. 3 can be extended to allow the slave to communicate several different status modes. For example, a rising edge within a first time period (e.g., a first 20% of the signal period) may indicate that the slave is functional. A rising edge in a subsequent time period (e.g., a next 20% of the signal period) may indicate that the slave is experiencing an under-voltage condition. A rising edge in a subsequent time period (e.g., a next 20% of the signal period) may indicate that the slave is experiencing an over-voltage condition. A rising edge in a subsequent time period (e.g., a next 20% of the signal period) may indicate that the slave is experiencing an over-temperature condition. A rising edge in a subsequent time period (e.g., a next 20% of the signal period) may indicate that the slave is experiencing a short circuit condition. The master detects which one of these conditions is being experienced by the slave by determining during which time period a high value in the common signal is first detected. In this signaling scheme, in one example, the slave device may indicate its status in a kind of thermometer-code within one bit time=period of the master.

Full Duplex Communication Using Common Signal

Described below are systems, methods, and circuitries that extend the bi-directional communication techniques above to provide full-duplex communication using the common line between the master and slave. Full duplex communication reduces the timing constraints for the interface between a master and slave because the available bandwidth can be used in a more efficient way. As just described, the timing master and the timing slave may communicate in parallel over the same physical interface. Full duplex operation offers synchronized communication on a bit timing level (e.g., all participants have similar bit timings), but allow different frame timing (e.g., there may be two data frames concurrently running (one from the master to the slave, the other from the slave to the master)). In one example, a frame may consist of a sequence of bits. Although being synchronous on a bit timing level, the start points on a frame timing level may be different Thus, the reaction time of each device can be respected (e.g., the master may ask for a status feedback frame and the slave answers when it is able to reply, without the need to answer with a defined delay). Using a UART-like communication protocol, each frame start is indicated by a start of frame (SOF) bit and the length of the frame is known. This means that an enable or chip select signal (like in an SPI or MSC communication) is not needed, because this information is incorporated into the data frame.

Figure 4A:
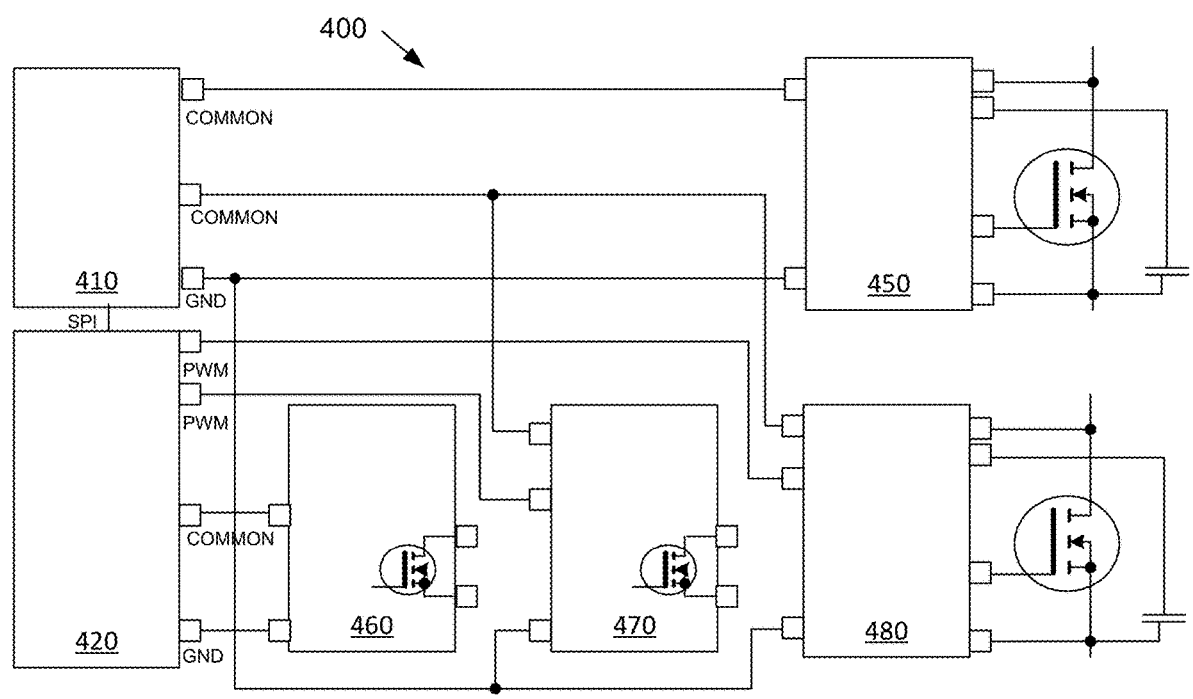
FIG. 4A illustrates one example of the communication system of FIGS. 1A and 1B in accordance with various aspects described.

FIG. 4A illustrates a communication system 400 that includes two types of master devices controlling several types of remote switches. A remote switch is an example of a power device controlled by a slave device (e.g. a gate driver device) communicating with a master device. The slave device may deliver status information about the remote switch or the load or environmental information (e.g. temperature, voltage levels, load conditions, etc.) to the master device. For example, Safety Device (SD) device 410 acts as a master that drives the common signal to a simple remote switch driver 450 that communicates with the master using just the common signal. The SD 410 is also master to an integrated switch 470 that is capable of PWM communication and a remote switch driver 480 that is capable of PWM communication. The safety device 410 may be configured to check the status of the switches in a redundant way or independently from a control device (e.g a microcontroller) that defines the switching activity of the switch. In addition, a microcontroller 420 acts as a master to a simple remote integrated switch 460. In the case of remote integrated switch 470 and remote switch driver 480, which share the common line with the master, it will be seen that, in one example using thermometer code signaling, the slave with the "worst" operation state will be detected by the master SD 410. While four different types of remote switches and remote switch drivers are shown, any number of combinations of masters and slaves can be connected and communicate via the common signal. The interface on which the common signal is transmitted/received may remain the same regardless of voltage/current class or type of isolation. In one example, a remote switch may be turned off (e.g. set to a safe state) by the PWM signal via the control device or by the communication interface via the safety device (redundant and diverse paths for safety-relevant applications).

Figure 4B:
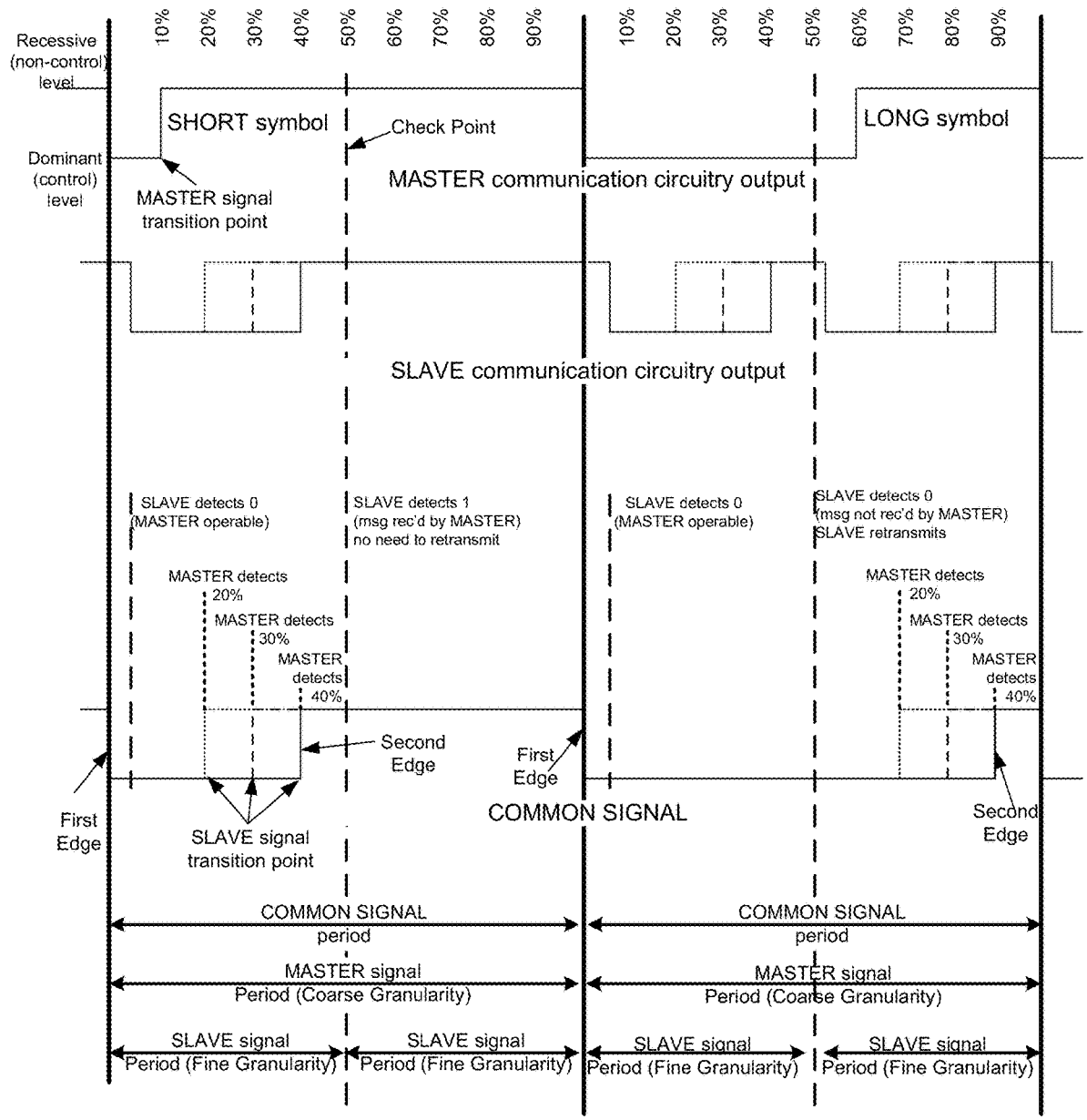
FIG. 4B illustrates a timing diagram of one communication protocol for full duplex operational status communication using edge timing in a signal in accordance with various aspects described.

FIG. 4B illustrates a timing diagram of one example of a data coding protocol in which a master device uses the common signal to communicate information about its operability status and also instructs one or more slaves to turn switches on and off. The slave device(s) can simultaneously communicate information about one of three different operability conditions, using the same common signal. In the timing diagram, two common signal periods are illustrated. Percentage of common signal period is illustrated across the top of the diagram for reference. The master signal output by master communication circuitry is illustrated in the top trace. The slave signal output by slave communication circuitry is illustrated in the middle trace. The common signal generated when the master and slave signals are combined on the common line (e.g., as illustrated in FIG. 2) is depicted in the bottom trace.

When the master is operable, the master generates (e.g., using master communication circuitry) a master signal by transitioning between a master control value and a master non-control value. This transition forms the first edge in the common signal which is used throughout the signal period for timing. The master can transmit either a short symbol or a long symbol. In a short symbol, the master transmits (e.g., by holding the common line low) the control value for a relatively short amount of time (e.g., 10% of the signal period as depicted in the first illustrated signal period). In a long symbol, the master transmits the control value for a longer period of time (e.g., 60% of the signal period as depicted in the second illustrated signal period). In one example, the master transmits a short symbol when the master wants to turn a slave device ON and a long symbol when the master wants to turn a slave device OFF and release a stored error condition. If the master is inoperable the master will not affect the common signal or equivalently is continuously transmitting a non-control value, thus indicating to the slave device that it may enter a defined inactive state.

When the slave is operable, the slave first detects (e.g., using slave detection circuitry) that the master is transmitting a master control value at the beginning of the signal period which indicates that the master is operable. The slave then determines (e.g., using slave communication circuitry) which information should be communicated to master regarding the slave's operation status. In the illustrated example, an operable slave can communicate one of three operation statuses: no warning, temporary warning, and error condition active. The slave communicates one of these three operation statuses by controlling the transition point or location of the second edge in the common signal. In the illustrated example, the slave can generate the second edge at 20% of the signal period (as determined relative to the first edge which marks the beginning of the signal period) to communicate that it has no warnings, at 30% of the signal period to communicated that it has a temporary warning, and at 40% of the signal period to indicate that it has an active error condition. An inoperable slave will have no impact on the common signal and the second edge is generated with the master timing, alerting the master that the slave is inoperable.

If the master is transmitting a short symbol, as depicted in the first illustrated signal period, the master will detect the second edge generated by the slave while transmitting the non-control value and will interpret the edge timing to determine the slave's operational status. In the case where only one slave is connected to the common communication signal, the master can directly read the status of the slave device. In the case where two or more slaves are connected to the common communication signal, the master may be informed about the worst condition "seen" by the connected slave devices. Due to the wired-AND connection of the common line and the use of thermometer code, if only one slave on the common line is experiencing an active error condition and thus generates the second edge of its signal at the 40% point, this edge will control the location of the second edge in the common signal and the master will determine that at least one slave on the common line is experience an error condition.

After setting the second edge of the common signal, the slave then determines the value of the common signal at the check point of the signal period (e.g., 50%) to determine whether the master is transmitting a short or long symbol. Since the master transmitted a short symbol in the first illustrated signal period, the slave will detect value of 1, which the slave interprets as meaning that the master wants a switch controlled by the slave to remain ON (or be turned ON). The slave also interprets the detected 1 in the common signal at the check point as indicating the master received the second edge generated by the slave communicating the slave's operational status. Note that when the master transmits a long symbol, the master does not receive the slave status information encoded in the timing of the second edge and the slave information should be retransmitted within the period of the master timing. It can be seen that, in the first half of this signal period, the master has communicated that it is operational and that the slave's switch should remain ON and the slave has communicated its operational status in full duplex mode.

Referring now to the second illustrated signal period in FIG. 4B, the master transmits a long signal in which the master control value is asserted by master communication circuitry until the expiration of 60% of the signal period. This long symbol is an instruction to the slave to turn OFF the switch under the slave's control. The slave first determines that the master is operational by determining that the common signal has a 0 value at the beginning of the signal period. Then, as in the first signal period, the slave transmits a slave signal having a slave/second edge or slave transition point at the appropriate timing (e.g., 20%, 30%, or 40% of the period). At a check point after it has finished its (first attempt of) status feedback (e.g. at the check point of the signal period), the slave determines that the common signal has a value of 0, which means that the master is transmitting a long symbol to instruct the slave to turn its switch OFF. It also means that the master has overwritten the first attempt of the slave device to send its status information by forcing the common signal to a defined level (dominant or control level).

The long symbol also means that the master did not receive the slave's operational status (it can be seen in the common signal that the master's long signal precluded transmission of the second edge on the common line). Thus, in response to detecting the 0 in the common signal at the check point of the signal period, the slave retransmits its operational status by generating a slave/second edge or slave transition point at the predetermined timing after the check point (as opposed to the first edge) of the signal period. This subsequent slave signal is transmitted on the common line because the master's long symbol is complete and the master is transmitting a non-control value. Thus, in addition to turning its switch OFF in response to a long symbol from the master, the slave also retransmits its status information by generating a subsequent slave/second edge at the appropriate timing after the period check point and transmitting it on the common line (second attempt). It can be seen that, in the first half of this signal period, the master has communicated that it is operational and that the slave's switch should be turned ON and in the second half of the period the slave has communicated its operational status in full duplex mode. Please note that the meaning of the information sent by the master was only an example and may lead to different behavior of the slave, depending on the specified function of the slave.

Depending on the type of information transferred by the master to the slave, there may be examples where the master may send out more symbols with different lengths (e.g. dividing the period into more than two parts). In this case, there may be more than one check point for the slave devices and more than two attempts to transfer the slave status information.

In the illustrated example, the master signal has a coarse granularity (equal to the common signal period) while the slave signal has a fine granularity (e.g. equal to half the coarse granularity). In other examples, the relationship between coarse and fine granularity may be different, for example, the coarse granularity may be equal to half the common signal period and/or the slave signal may have a granularity equal to a third or a quarter of the coarse granularity period.

Figure 5A:
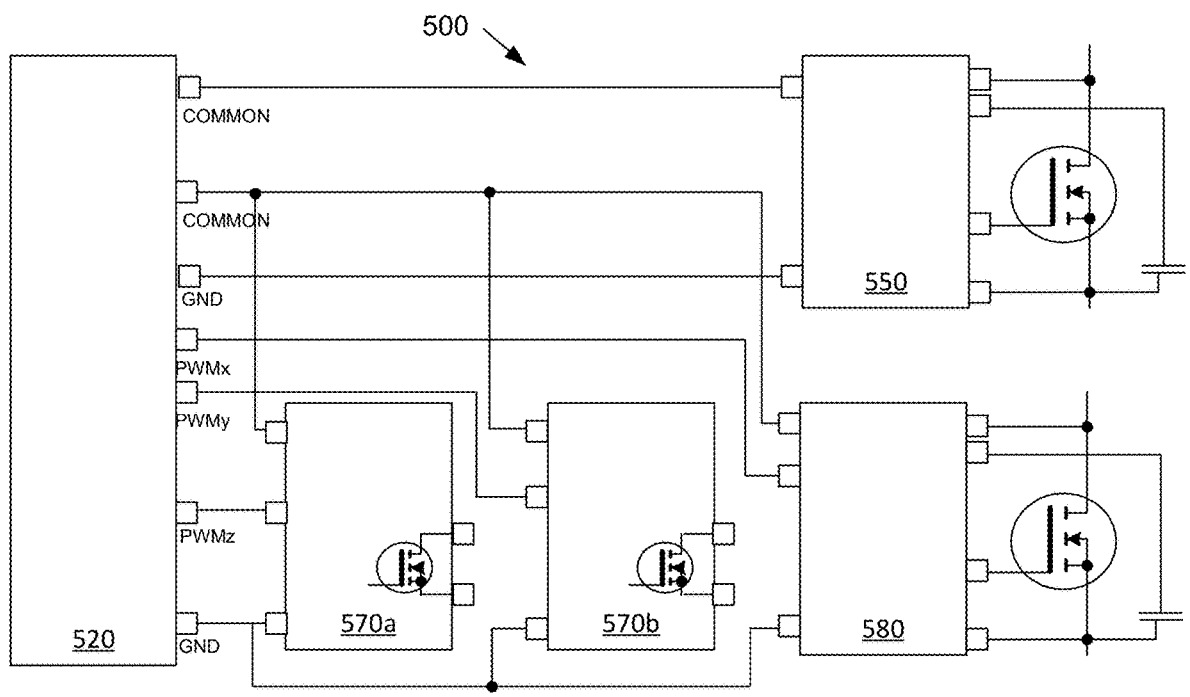
FIG. 5A illustrates one example of the communication system of FIGS. 1A and 1B in accordance with various aspects described.

FIG. 5A illustrates a communication system 500 in which the common signal is used for full duplex communication of configuration and status information between a master (e.g., microcontroller) 520 and multiple slaves 570a, 570b, 580 using the same common line/common signal. This allows for configuration of the slaves including feedback from the slaves without having dedicated connections between each slave and the master 520. The slave devices 570a, 570b, and 580 that share the same common line with the master 520 can be individually addressed by a function address or identifier stored in nonvolatile memory if available. In another example, a chip identifier may be used or dynamic enumeration may be used if an individual function address is not available. In this example, while no nonvolatile memory is needed to store an identifier, arbitration and/or collision detection and handling may be needed to support full duplex communication. In another example, illustrated in FIG. 5A, the slave devices are addressed using an existing PWM line, meaning that no nonvolatile memory is needed to store an identifier.

In the example illustrated in FIG. 5A, each of the slave devices 570a, 570b, 580 is connected to the master device 520 via an independent PWM signal. This signal line may be driven from a timer channel in the master 510 to achieve a high precision timing or a high timing resolution. If the slaves do not contain identifying information, the following enumeration procedure may be used. The slave devices are set into an enumeration mode via the common signal in which the PWM signal is not considered as providing a PWM input (e.g., the switches driven by the slaves are disabled in the enumeration mode) but rather the PWM is used for slave selection. A slave that is in enumeration mode is selected by its PWM signal (or any other signal that is unique to the slave in other examples) and is provided with an application name or identifier by way of the common signal. In other words, if the master can determine which individual slave is currently addressed via the PWM (unique) connection, the master can distribute names or identifiers step by step to each slave by communicating bit values on the common line (see FIG. 6 for an example of a UART signal protocol that might be used for this communication). In normal operation mode, the PWM signal is considered as PWM information for controlling the switch and each slave device can be individually addressed over the common signal line using the slave's previously distributed name or identifier.

Figure 5B:
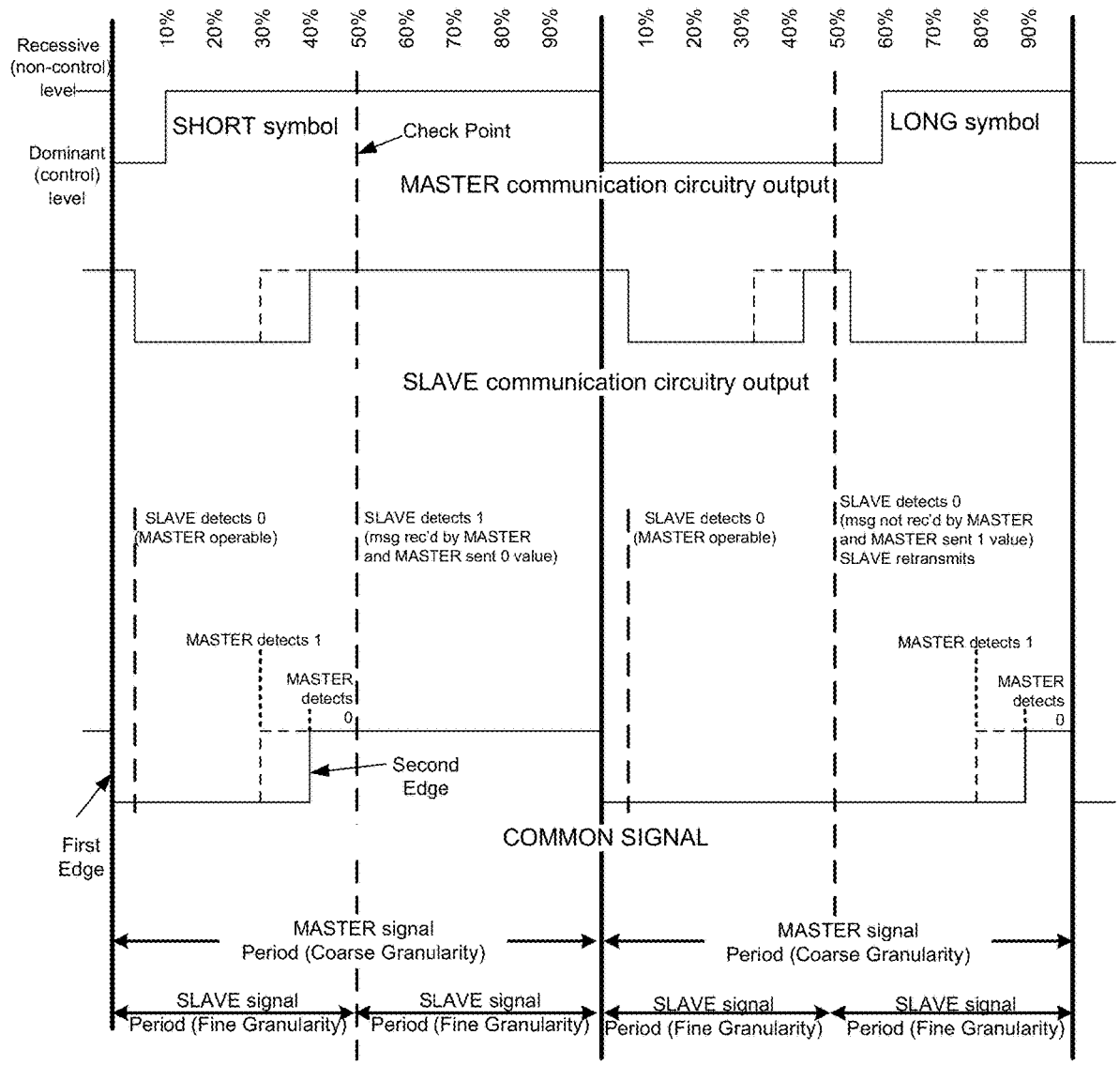
FIG. 5B illustrates a timing diagram of one communication protocol for full duplex communication of bit data using edge timing in a signal in accordance with various aspects described.

FIG. 5B illustrates a timing diagram of one example of a data coding protocol in which a master device and slave device communicate bit values in full duplex mode (e.g., at the same time, using the same common signal). In the timing diagram, two common signal periods are illustrated. Percentage of common signal period is illustrated across the top of the diagram for reference. The master signal output by master communication circuitry is illustrated in the top trace. The slave signal output by slave communication circuitry is illustrated in the middle trace. The common signal generated when the master and slave signals are combined on the common line (e.g., as illustrated in FIG. 2) is depicted in the bottom trace.

When the master is operable, the master generates (e.g., using master communication circuitry) a master signal by transitioning between transmitting a master control value and a master non-control value. This transition forms the first edge in the common signal which is used throughout the signal period for timing. The master can transmit either a short symbol corresponding to a 0 bit value or a long symbol corresponding to a 1 bit value. In a short symbol, the master transmits (e.g., by holding the common line low) the control value for a relatively short amount of time (e.g., 10% of the signal period as depicted in the first illustrated signal period). In a long symbol, the master transmits the control value for a longer period of time (e.g., 60% of the signal period as depicted in the second illustrated signal period).

When the slave is operable, slave first detects (e.g., using slave detection circuitry) that the master is transmitting a master control value at the beginning of the signal period which indicates that the master is operable. The slave communicates a bit value by controlling the transition point or location of the second edge in the common signal. In the illustrated example, the slave can generate the second edge at 30% of the signal period (as determined relative to the first edge which marks the beginning of the signal period) to communicate a bit value of 1 or at 40% of the signal period to communicate a 0 bit value. If the master is transmitting a short symbol, as depicted in the first illustrated signal period, the master will detect the second edge generated by the slave and interpret the edge timing to determine the slave's operational status. The slave then determines the value of the common signal at the check point of the signal period (e.g., 50%) and determines that the master is has transmitted a short symbol indicating a bit value of 0. The slave also interprets the 1 in the common signal at the check point as indicating the master received the second edge generated by the slave communicating the slave's intended data bit value. Note that when the master transmits a long symbol, the master does not receive the slave status information encoded in the timing of the second edge before the check point and the slave information should be retransmitted after the check point, but within the period of the common signal. It can be seen that, before the check point (e.g. in the first half of this signal period), the master has communicated a bit value and slave has also communicated a bit value.

Referring now to the second illustrated signal period in FIG. 5B, the master transmits a long signal in which the master control value is asserted by master communication circuitry until a point after the check point, e.g. the expiration of 60% of the signal period. This long symbol corresponds to a bit value of 1. The slave first determines that the master is operational by determining that the common signal has a 0 value at the beginning of the signal period. Then, as in the first signal period, the slave transmits a slave signal having a slave/second edge or slave transition point at the appropriate timing to communicate the slave's bit value (e.g., 30%, or 40% of the period). At the check point of the signal period, the slave determines that the common signal has a value of 0, which means that the master is transmitting a long symbol or a bit value of 1.

The long symbol also means that the master did not receive the slave's operational status (it can be seen in the common signal that the master's long signal precluded transmission of the second edge on the common line). Thus, in response to detecting the 0 in the common signal at the check point of the signal period, the slave retransmits its bit value by generating a slave/second edge or slave transition point at the predetermined timing after the check point (as opposed to the first edge) of the signal period. This slave signal is transmitted on the common line because the master's long symbol is complete and the master is transmitting a non-control value. Thus, in addition to receiving the bit value of 1 from the master, the slave also retransmits its bit value by generating a subsequent slave/second edge at the appropriate timing after the period check point and transmitting it on the common line. Similar to the example shown in FIG. 4B, the signal period of the common signal may be split into several parts (with a respective check point for each part) in the master is configured to transmit more than 2 symbols of different length.

In the illustrated example, the master may output two different duty cycles and the slave device may output two different data bit levels, leading to 4 different resulting duty cycles on the common line. Here the master data bit level defines if the duty cycle is below or above 50% of the bit time. Each slave data bit level is represented by two different resulting duty cycles (e.g. 30%, and 70% for 1 bit value and 40% and 80% for a 0 bit value). In other examples, there may be more than two possible values for each device.

Figure 6:
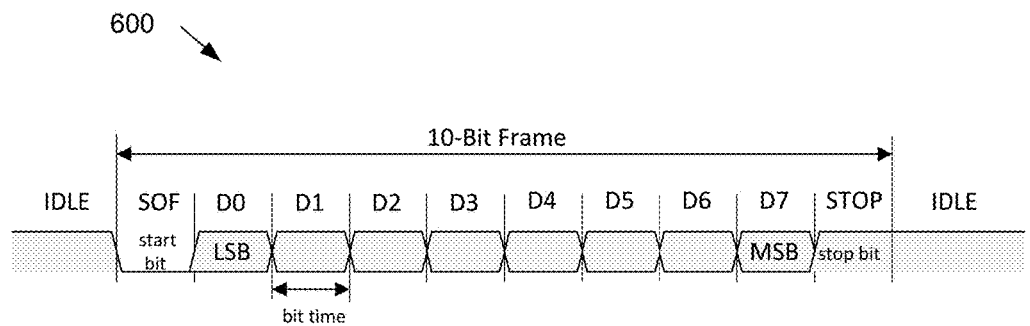
FIG. 6 illustrates one example of an eight-bit Universal Asynchronous Receiver Transmitter (UART) signal format.

FIG. 6 illustrates an example eight-bit UART signal 600. The UART signal includes a ten bit data frame that begins with a start (SOF) bit and ends with a STOP bit. Thus, in each frame eight bits of information (e.g., starting with the least significant bit and ending with the most significant bit) can be serially communicated. The IDLE level of either the transmitter or receiver is the recessive or non-control level, e.g. the high level. In UART communication, both devices must use the same duration for the ten bit frame, which typically requires a synchronized clock signal for both devices. However, due to the self-synchronization principle of the full duplex communication described herein that uses the common signal to transmit data bits between master and slave, UART-like data frames of more than 8 bits (e.g., 32 bits) are easily feasible.

Figure 7:
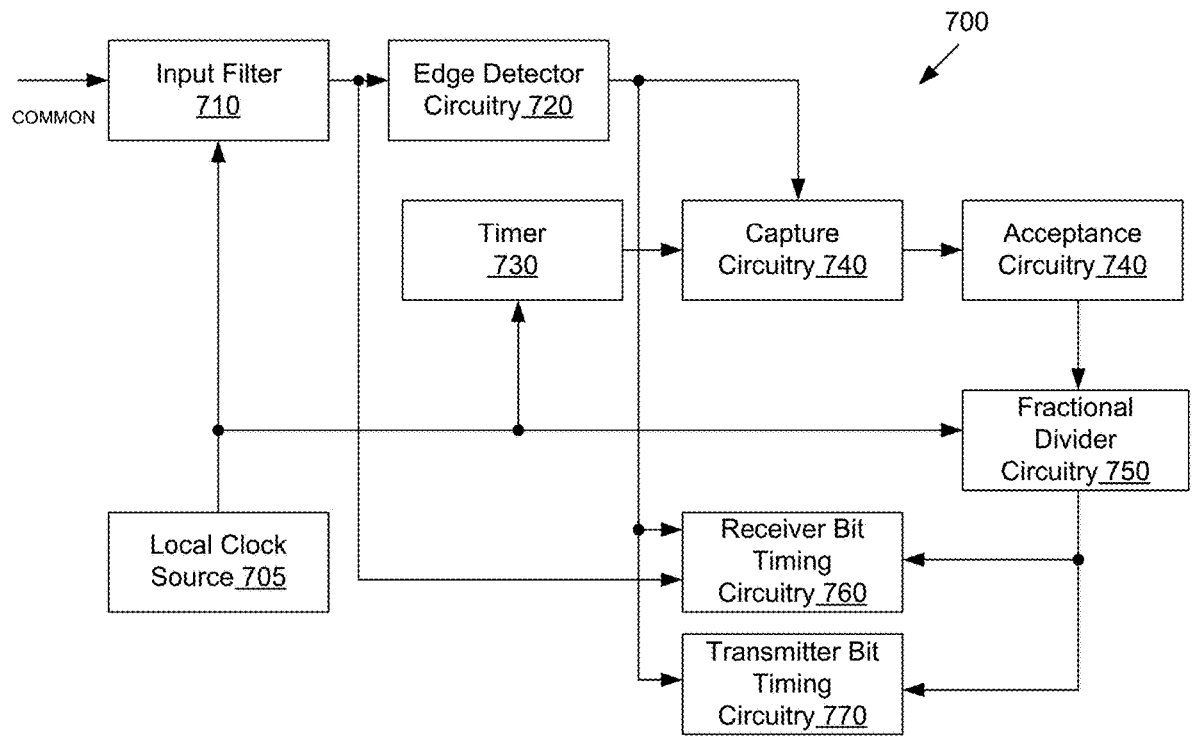
FIG. 7 illustrates one example of a bit timing system in accordance with various aspects described.

FIG. 7 illustrates a bit timing system 700 that can be used by either a master or slave device to determine the timing for first or second edges in the common signal, respectively. A local clock 705 is used as a local master timing signal (either in the slave device or in the master device). An input filter 710 receives the common signal and provides a filtered common signal to edge detector circuitry 720. In one example, the input filter allows the reduction of noise effects on the signal and improves the "quality" of the received signal. Depending on the type of connection between the master device and the slave device, the filter may be important. In another example with very low noise effects, the filter may be omitted. In the master device, the edge detector detects edges of the second edge type while in a slave device the edge detector detects edges of the first edge type. A timer 730 accumulates elapsed time based on the local clock so that capture circuitry 740 can associate a detected edge with a given time. Acceptance circuitry 740 determines if the edge timing is within an expected range (e.g., 10% or 60% of signal period for the first edge). If so, fractional divider circuitry 750 converts to edge timing to a percentage of signal period. A fractional divider is one possible implementation to obtain a timing relation of x % with respect to another timing interval (e.g. the signal period P). A fractional divider may divide the measured length P into N smaller intervals of shorter length, e.g. in 20 intervals of 5% of P. The number of small intervals may be considered for the generation and the reception of the edges within the signal period. Since the measured length P is not necessarily a multiple of 20 clock cycles, a fractional divider (P/N) allows a more precise generation of the small intervals compared to an integer divider. The edge and its timing is provided to receiver bit timing circuitry 760 so that the edge can be interpreted by detection circuitry and also to transmitter bit timing circuitry 770 so that communication circuitry can use the edge as a basis for timing a communicated edge.

Figure 8:
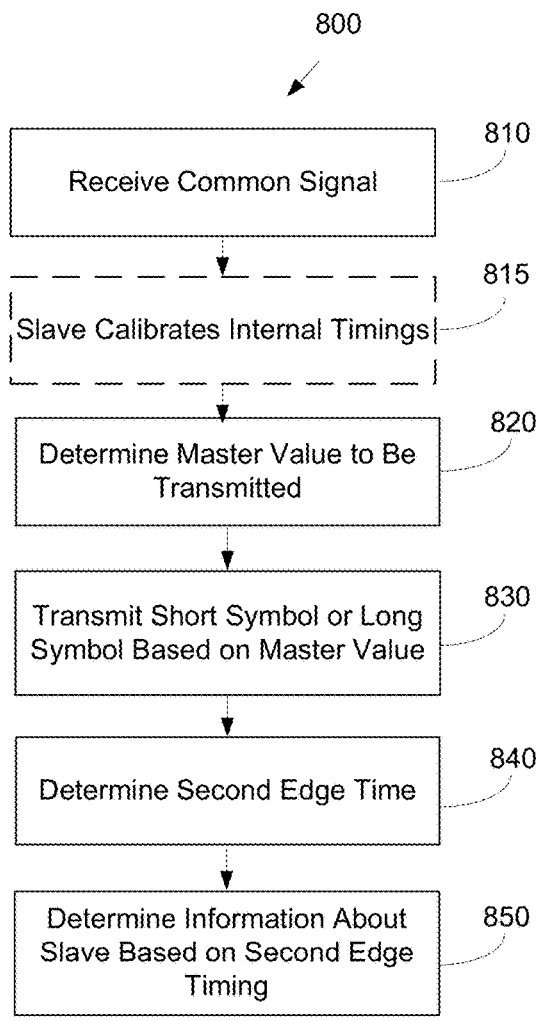
FIGS. 8 and 9 illustrate example methods for performing full duplex communication using edge timing in a common signal in accordance with various aspects described.

FIG. 8 illustrates an example method 800 performed by a device for communicating with another device using edge timing in a common signal. The method 800 may be performed, for example, by master 410, 420 or microcontroller 520 of FIGS. 4A and 5A, respectively. A master device may generate the first edge of the common signal via an output stage (e.g. open-drain output) and monitor it via an input stage (e.g Schmitt-trigger stage). At 810 the method includes receiving a common signal on a signal line between the master device and the slave device. The common signal results from combination of a slave signal transmitted on the signal line and a master signal simultaneously transmitted on the signal line. The common signal comprises a series of signal periods, and each signal period comprises a first edge of a first type and a second edge of a second type different from the first type. At 815, a slave device may update the received period value of the common signal to calibrate its internal timing. The method includes, at 820, in each signal period of the series of signal periods, determining a master value to be transmitted to the slave device.

The method includes, at 830, in response transmitting a short symbol when the master value is a first value or a long symbol when the master value is a second value. A short symbol includes the first edge formed by the master control value, wherein the master control value has duration that is shorter than the time between the first edge and the check point, e.g. half a signal period duration and a master recessive level for a remainder of the signal period. The long symbol includes the first edge formed by the master control value, wherein the master control value has duration that is longer than the time between the first edge and the check point, e.g. half the signal period duration and the master recessive level for a remainder of the signal period. At 840, the method includes, while transmitting the master recessive level, determining a second edge timing corresponding to a time between the first edge and the second edge in the common signal. At 850 information being communicated by the slave device is determined based at least on the determined second edge timing.

Figure 9:
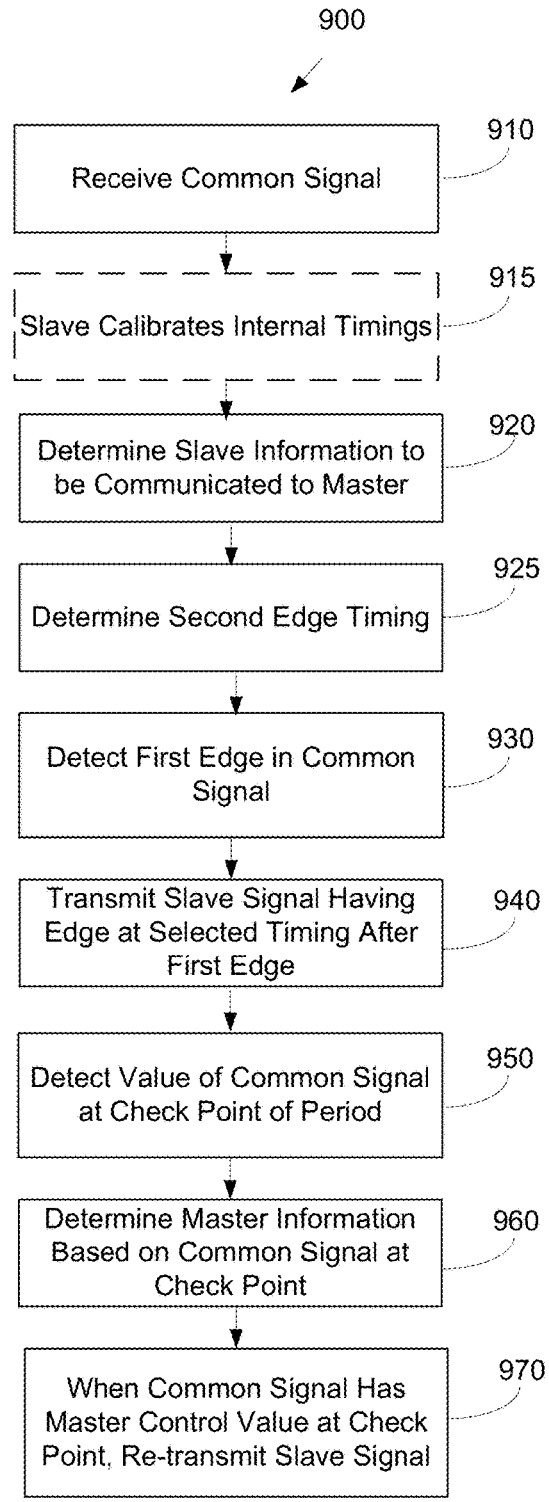

FIG. 9 illustrates an example method 900 performed by a device for communicating with another device using edge timing in a common signal. The method 900 may be performed, for example, by slaves 450, 460, 470, 480 or 550, 570*a*, 570*b*, 580 FIGS. 4A and 5A, respectively. A master device may generate the first edge of the common signal via an output stage (e.g. open-drain output) and monitor it via an input stage (e.g., Schmitt-trigger stage). At 910, the method includes receiving a common signal on a signal line between the slave device and the master device. The common signal results from combination of a slave signal transmitted on the signal line and a master signal simultaneously transmitted on the signal line. The common signal includes a series of signal periods, wherein each signal period comprises a first edge of a first type and a second edge of a second type different from the first type. In addition, as in act 815, a slave device may update the received period value of the common signal to calibrate its internal timing. At 920, the method includes, in selected signal periods of the series of signal periods, determining slave information to be communicated to the master device.

At 925, the method includes selecting a second edge timing corresponding to the determined slave information. At 930, the method includes detecting the first edge in the common signal and at 940, transmitting a slave signal having a first slave edge of the second type at the selected second edge timing after the first edge. The method includes, at 950, detecting a value of the common signal at a check point of the signal period and at 960, determining master information being communicated by the master device based on the detected value of the common signal at the check point of the signal period. The method includes, at 970, transmitting the slave signal having a second slave edge of the second type at the selected edge timing after the check point when the common signal has a master dominant level at the check point.

It can be seen from the foregoing description that the described systems, circuitries, and methods allow for the communication of status and/or data between two devices with a common signal conducted on a single signal line by using the timing of one type of edge in the common signal to convey information about a first device and the timing of the other type of edge to convey information about a second device.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for bidirectional communication using edge timing according to embodiments and examples described herein.

In an Example 1, a method with a master device comprises receiving a common signal on a signal line between the master device and a slave device, wherein the common signal results from combination of a slave signal transmitted by the slave device on the signal line and a master signal transmitted by the master device on the signal line. The common signal comprises a series of signal periods, wherein each signal period comprises a first edge of a first type and a second edge of a second type different from the first type. In a signal period of the series of signal periods, the method comprises determining a master level to be transmitted to the slave device, and, in response, when the master level comprises a first value, transmitting a first symbol on the signal line with a duration that is shorter than a time duration between the first edge and a check point, or when the master level comprises a second, different value, transmitting a second symbol on the signal line with a duration that is longer than the time duration between the first edge and the check point. Further, after the transmission of the first or second symbol, determining a second edge timing corresponding to a second time duration between the first edge and the second edge in the common signal, and determining information being communicated by the slave device based at least on the determined second edge timing.

In an Example 2 that depends upon Example 1, the method further comprises determining a level of the common signal during a first window occurring a first predetermined time after an end of the transmitted master level, and determining a slave bit value being communicated by the slave device based on the level of the common signal.

In an Example 3 that depends upon Example 1, the method further comprises determining a first level of the common signal during a first window occurring a first predetermined time after an end of the transmitted master level, and determining an operational status of the slave device based on the first level of the common signal.

In an Example 4 that depends upon Example 3, the method further comprises determining a second level of the common signal during a second window occurring a second predetermined time after the end of the transmitted master level, and determining one of a plurality of failure modes for the slave device based on the first level and the second level of the common signal.

In an Example 5 that depends upon Example 1, the method further comprises determining that the slave device is inoperable when the second edge is not delayed by the slave device compared to the master signal.

In an Example 6 that depends upon Example 1, the master device and the slave device are connected to each other using a wired-AND connection, and wherein transmitting the master level comprises selectively setting the signal line to a defined level.

In an Example 7, a method with a slave device comprises receiving a common signal on a signal line between a master device and the slave device, wherein the common signal results from combination of a slave signal transmitted by the slave device on the signal line and a master signal transmitted by the master device on the signal line, and the common signal comprises a series of signal periods. In the method each signal period comprises a first edge of a first type and a second edge of a second type different from the first type. In a signal period of the series of signal periods, the method comprises determining slave information to be communicated to the master device, selecting a second edge timing corresponding to the determined slave information, detecting the first edge in the common signal, and transmitting a slave signal having a first slave edge of the second type at the selected second edge timing after the first edge of the first type. The method further comprises detecting a level of the common signal at a check point of the signal period, and determining master information being communicated by the master device based on the detected level of the common signal at the check point of the signal period. When the common signal has a master level at the check point, the method comprises transmitting the slave signal having a second slave edge of the second type at the selected edge timing after the check point.

In an Example 8 that depends upon Example 7, the method further comprises determining that the master device is inoperable when no first edge is detected in the common signal for a predetermined amount of time.

In an Example 9 that depends upon Example 7, the method further comprises determining a duration of the signal period based at least on a time between one or more pairs of consecutive first edges in the common signal.

In an Example 10 that depends upon Example 7, the method further comprises determining a slave bit value to be communicated to the master device, and selecting the second edge timing based on the slave bit value.

In an Example 11 that depends upon Example 7, the method further comprises determining a slave status to be communicated to the master device, and selecting the second edge timing based on the slave status.

In an Example 12 that depends upon Example 7, the master device and the slave device are connected to each other using a wired-AND connection, and transmitting the slave signal comprises selectively setting the signal line to a slave dominant or control level.

In an Example 13, a master device configured to be connected to a slave device by a signal line is disclosed. The the signal line conducts a common signal resulting from a combination of a master signal transmitted by the master device on the signal line and a slave signal transmitted by the slave device on the signal line. The common signal comprises a series of signal periods, and each signal period comprises a first edge of a first type and a second edge of a second type different from the first type. The master device comprises master communication circuitry configured to, in a period of the series of signal periods: determine a master level to be transmitted to the slave device, and, in response, when the master level has a first value, transmit a first symbol on the signal line with a duration that is shorter than a time duration between the first edge and a check point. Alternatively, when the master level comprises a second value, the master communication circuitry is configured to transmit a second symbol on the signal line with a duration that is longer than the time duration between the first edge and the check point. The master device further comprises master detection circuitry configured to: after the transmission of the first or second symbol, determine a second edge timing corresponding to a second time duration between the first edge and the second edge in the common signal, and determine information being communicated by the slave device based at least on the determined second edge timing.

In an Example 14 that depends upon Example 13, the master detection circuitry is further configured to: determine a level of the common signal during a first window occurring a first predetermined time after an end of the transmitted master level, and determine a slave bit value being communicated by the slave device based on the level of the common signal.

In an Example 15 that depends upon Example 13, the master detection circuitry is further configured to: determine a first level of the common signal during a first window occurring a first predetermined time after an end of the transmitted master level, and determine an operational status of the slave device based on the first level of the common signal.

In an Example 16 that depends upon Example 15, the master detection circuitry is further configured to: determine a level of the common signal during a second window occurring a second predetermined time after the end of the transmitted master level, and determine one of a plurality of failure modes for the slave device based on the first value and the second level of the common signal.

In an Example 17 that depends upon Example 13, the master detection circuitry is further configured to determine that the slave device is inoperable when a second edge is not delayed by the slave device.

In an Example 18 that depends upon Example 13, the master device and the slave device are connected to each other using a wired-AND connection, and the master communication circuitry is configured to transmit the master level by selectively setting the signal line to a defined level.

In an Example 19, a slave device configured to be connected to a master device by a signal line is disclosed. The signal line conducts a common signal resulting from a combination of a master signal transmitted by the master device on the signal line and a slave signal transmitted by the slave device on the signal line. Further, the common signal comprises a series of signal periods, and each signal period comprises a first edge of a first type and a second edge of a second type different from the first type. The slave device comprises slave communication circuitry configured to, in a signal period of the series of signal periods: determine slave information for communication to the master device, and select a second edge timing corresponding to the determined slave information. The slave communication circuitry is further configured to: detect the first edge in the common signal, and transmit a slave signal having an edge of the second type at the selected second edge timing after the first edge. Further, the slave detection circuitry is configured to: detect a level of the common signal at a check point, determine master information being communicated by the master device based on the detected level of the common signal at the check point; and when the common signal has a master level at the check point, control the slave communication circuitry to transmit an edge of the second type at the selected edge timing after the check point.

In an Example 20 that depends upon Example 19, the slave detection circuitry is configured to determine that the master device is inoperable when no first edge is detected in the common signal for a predetermined amount of time.

In an Example 21 that depends upon Example 19, the slave detection circuitry is configured to determine a duration of the signal period based at least on a time between one or more pairs of consecutive first edges in the common signal.

In an Example 22 that depends upon Example 19, the slave communication circuitry is configured to: determine a slave bit value to be communicated to the master device, and select the second edge timing based on the slave bit value.

In an Example 23 that depends upon Example 19, the slave communication circuitry is configured to: determine a slave status to be communicated to the master device, and select the second edge timing based on the slave status.

In an Example 24 that depends upon Example 19, the master device and the slave device are connected to each other using a wired-AND connection, and wherein the slave communication circuitry is configured to transmit the slave signal by selectively setting the signal line to a slave dominant or control level.

In an Example 25, a method for full duplex communication between a master device and a slave device comprises determining a signal period of a common signal that results from combination of a master signal and a slave signal. The method further comprises, with the master device: determining a master value to be communicated to the slave device, and determining a master signal transition point based on the determined master value, such that when the master signal changes value during a first coarse granularity period a first master value is communicated in the common signal. Further, when the master signal changes value during a second coarse granularity portion a second a second master value is communicated in the common signal. In the method the first coarse granularity period and the second coarse granularity period are predetermined portions of the signal period, The method further comprises transmitting the master signal with the determined master signal transition point, and with the slave device: determining a slave value to be communicated to the master device, and determining a slave signal transition point based on the determined slave value, such that when the slave signal transition point occurs during a first fine granularity period a first slave value is communicated in the common signal and when the slave signal transition point occurs during a second fine granularity period a second slave value is communicated. In this instance the first and second fine granularity periods are predetermined portions of the coarse granularity period, and the method further comprises transmitting the slave signal with the determined slave signal transition point in one or more of the fine granularity periods.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

What is claimed is:

1. A method, comprising, with a master device:
    receiving a common signal on a signal line between the master device and a slave device, wherein the common signal results from combination of a slave signal transmitted by the slave device on the signal line and a master signal transmitted by the master device on the signal line, wherein the common signal comprises a series of signal periods, wherein each signal period comprises a first edge of a first type and a second edge of a second type different from the first type; and
    in a signal period of the common signal:
        determining a value to be transmitted to the slave device, and, in response,
            when the value comprises a first value, transmitting a master signal communicating a first symbol on the signal line, wherein the master signal causes the first edge in the signal period and has a duration that is shorter than a time duration between the first edge and a check point; or
            when the value comprises a second value, transmitting a master signal communicating a second symbol on the signal line, wherein the master signal causes the first edge in the signal period and has a duration that is longer than the time duration between the first edge and the check point;
        determining a first level of the common signal during a first window occurring at a first predetermined time after the transmission of the first or second symbol; and
        determining information being communicated by the slave device based at least on the first level of the common signal.

2. The method of claim 1, further comprising:
    determining a slave bit value being communicated by the slave device based on the first level of the common signal.

3. The method of claim 1, further comprising:
    determining an operational status of the slave device based on the first level of the common signal.

4. The method of claim 3, further comprising:
    determining a second level of the common signal during a second window occurring a second predetermined time after an end of the transmitted master level;
    and determining one of a plurality of failure modes for the slave device based on the first level and the second level of the common signal.

5. The method of claim 1, further comprising determining that the slave device is inoperable when the second edge is not delayed by the slave device compared to the master signal.

6. The method of claim 1, wherein the master device and the slave device are connected to each other using a wired-AND connection, and wherein transmitting the master level comprises selectively setting the signal line to a defined level.

7. A method, comprising, with a slave device:
    receiving a common signal on a signal line between a master device and the slave device, wherein the common signal results from combination of a slave signal transmitted by the slave device on the signal line and a master signal transmitted by the master device on the signal line, wherein the common signal comprises a series of signal periods, wherein each signal period comprises a first edge of a first type and a second edge of a second type different from the first type; and
    in a signal period of the series of signal periods:
        determining slave information to be communicated to the master device;
        selecting a second edge timing corresponding to the determined slave information;
        detecting the first edge in the common signal;
        transmitting a slave signal having a first slave edge of the second type at the selected second edge timing after the first edge of the first type;
        detecting a level of the common signal at a check point of the signal period;
        determining master information being communicated by the master device based on the detected level of the common signal at the check point of the signal period; and
        when the common signal has a master level at the check point, transmitting the slave signal having a second slave edge of the second type at the selected edge timing after the check point.

8. The method of claim 7, further comprising determining that the master device is inoperable when no first edge is detected in the common signal for a predetermined amount of time.

9. The method of claim 7, further comprising determining a duration of the signal period based at least on a time between one or more pairs of consecutive first edges in the common signal.

10. The method of claim 7, further comprising:
    determining a slave bit value to be communicated to the master device; and
    selecting the second edge timing based on the slave bit value.

11. The method of claim 7, further comprising:
    determining a slave status to be communicated to the master device; and
    selecting the second edge timing based on the slave status.

12. The method of claim 7, wherein the master device and the slave device are connected to each other using a wired-AND connection, and wherein transmitting the slave signal comprises selectively setting the signal line to a slave control level.

13. A master device configured to be connected to a slave device by a signal line, wherein the signal line conducts a common signal resulting from a combination of a master signal transmitted by the master device on the signal line and a slave signal transmitted by the slave device on the signal line, wherein the common signal comprises a series of signal periods, and wherein each signal period comprises a first edge of a first type and a second edge of a second type different from the first type, the master device comprising:
- master communication circuitry configured to, in a period of the series of signal periods:
  - determine a master level to be transmitted to the slave device, and, in response,
    - when the master level has a first value, transmit a first symbol on the signal line with a duration that is shorter than a time duration between the first edge and a check point; or
    - when the master level comprises a second value, transmit a second symbol on the signal line with a duration that is longer than the time duration between the first edge and the check point; and
- master detection circuitry configured to:
  - after the transmission of the first or second symbol, determine a second edge timing corresponding to a second time duration between the first edge and the second edge in the common signal; and
  - determine information being communicated by the slave device based at least on the determined second edge timing.

14. The master device of claim 13, wherein the master detection circuitry is further configured to:
- determine a level of the common signal during a first window occurring a first predetermined time after an end of the transmitted master level; and
- determine a slave bit value being communicated by the slave device based on the level of the common signal.

15. The master device of claim 13, wherein the master detection circuitry is further configured to:
- determine a first level of the common signal during a first window occurring a first predetermined time after an end of the transmitted master level; and
- determine an operational status of the slave device based on the first level of the common signal.

16. The master device of claim 15, wherein the master detection circuitry is further configured to:
- determine a level of the common signal during a second window occurring a second predetermined time after the end of the transmitted master level; and
- determine one of a plurality of failure modes for the slave device based on the first value and the second level of the common signal.

17. The master device of claim 13, wherein the master detection circuitry is further configured to determine that the slave device is inoperable when a second edge is not delayed by the slave device.

18. The master device of claim 13, wherein the master device and the slave device are connected to each other using a wired-AND connection, and wherein the master communication circuitry is configured to transmit the master level by selectively setting the signal line to a defined level.

19. A slave device configured to be connected to a master device by a signal line, wherein the signal line conducts a common signal resulting from a combination of a master signal transmitted by the master device on the signal line and a slave signal transmitted by the slave device on the signal line, wherein the common signal comprises a series of signal periods, and wherein each signal period comprises a first edge of a first type and a second edge of a second type different from the first type, the slave device comprising:
- slave communication circuitry configured to, in a signal period of the series of signal periods:
  - determine slave information for communication to the master device;
  - select a second edge timing corresponding to the determined slave information;
  - detect the first edge in the common signal; and
  - transmit a slave signal having an edge of the second type at the selected second edge timing after the first edge; and
- slave detection circuitry configured to:
  - detect a level of the common signal at a check point;
  - determine master information being communicated by the master device based on the detected level of the common signal at the check point; and
  - when the common signal has a master level at the check point, control the slave communication circuitry to transmit an edge of the second type at the selected edge timing after the check point.

20. The slave device of claim 19, wherein the slave detection circuitry is configured to determine that the master device is inoperable when no first edge is detected in the common signal for a predetermined amount of time.

21. The slave device of claim 19, wherein the slave detection circuitry is configured to determine a duration of the signal period based at least on a time between one or more pairs of consecutive first edges in the common signal.

22. The slave device of claim 19, wherein the slave communication circuitry is configured to:
- determine a slave bit value to be communicated to the master device; and
- select the second edge timing based on the slave bit value.

23. The slave device of claim 19, wherein the slave communication circuitry is configured to:
- determine a slave status to be communicated to the master device; and
- select the second edge timing based on the slave status.

24. The slave device of claim 19, wherein the master device and the slave device are connected to each other using a wired-AND connection, and wherein the slave communication circuitry is configured to transmit the slave signal by selectively setting the signal line to a slave control level.

* * * * *